June 10, 1924.  1,497,317

J. M. ASKIN

BATTERY

Filed Dec. 29, 1919

Inventor:
J. M. Askin
By Dyrenforth, Lee, Chritton & Wiles,
Attys.

Patented June 10, 1924.

1,497,317

UNITED STATES PATENT OFFICE.

JOSEPH M. ASKIN, OF CHICAGO, ILLINOIS, ASSIGNOR TO STUART PRODUCTS CORPORATION.

BATTERY.

Application filed December 29, 1919. Serial No. 347,899.

*To all whom it may concern:*

Be it known that I, JOSEPH M. ASKIN, a citizen of Russia, residing at Chicago, in the county of Cook and State of Illinois, have invented a new and useful Improvement in Batteries, of which the following is a specification.

My invention relates, more particularly, to electrolytes of batteries of the so called dry, or semi-dry, type; and one of my objects, generally stated, is to provide for the production of a battery of the type referred to, which substantially immediately becomes conditioned for use, upon assembling the elements of the battery, without requiring the heating of the electrolyte, thereby facilitating the production of a battery of this type. In this connection it may be stated that the invention has particular application to batteries, the elements of which are assembled for use by the user, to thereby eliminate what is commonly known as shelf-deterioration, viz, the deterioration which occurs between the time of making the battery, as at a factory, and the time it goes into use after reaching the user, deterioration of the battery, affecting its life, and therefore its usefulness, beginning as soon as the battery is made up.

Furthermore the invention relates, more particularly, to batteries to be conditioned for use by unskilled persons, as for example the general purchasing public and in this connection it is a further object to provide a battery which may be readily and quickly made up and become substantially immediately conditioned for use, by one unskilled in the art of manufacturing batteries.

Figure 1:
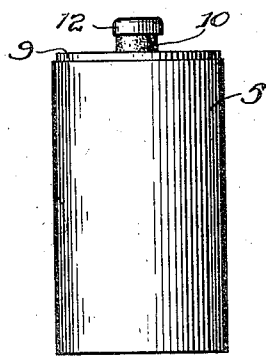
Figure 2:
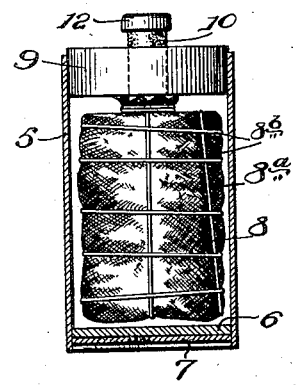
Figure 3:
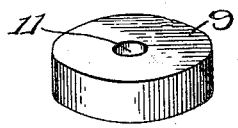
Figure 4:
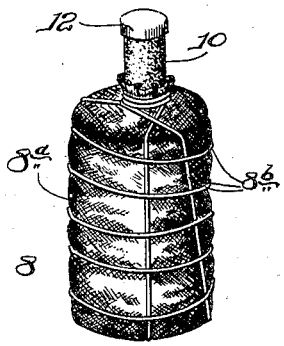

While the particular construction of battery used is immaterial in the employment of my invention, I have chosen to illustrate it in connection with a battery of a particular form, but without intending thereby to limit the invention. In the accompanying drawing, Figure 1 shows by a view in side elevation a construction of battery in connection with which my invention may be employed. Figure 2 is a view in vertical section of the same. Figure 3 is a perspective view of the head, or plug, of the battery; and Figure 4, a perspective view of the positive electrode, or depolarizer, of the battery.

The construction of battery shown comprises a receptacle 5, shown as of cylindrical form, with its bottom closed and its top open, this part of the battery presenting the negative electrode and preferably itself being the electrode. For example, the receptacle 5 may be formed of zinc and in the particular construction illustrated, a disk 6 of water-proof material rests against the upper side of the bottom 7 of the receptacle which may be integral with the cylindrical wall of the receptacle or formed as a separate disk secured in place in any suitable manner as by soldering it. The positive electrode of the battery is indicated at 8, this electrode being held in place within the receptacle 5, in spaced relation throughout its extent, from the wall of the receptacle, by a closure member 9 shown in the form of a head, or plug, into which, and preferably through which, the upper end of the electrode 8, extends, this head being formed of any suitable material adapting it to be inserted into the open end of the receptacle 5. The two electrodes should be insulated from each other at the head 9 and therefore the latter is preferably formed of insulating material, as for example of cork or rubber compound. In assembling the parts of the particular battery illustrated the head 9, preferably preliminarily assembled with the electrode 8 to extend at its core 10 into and through an opening 11 in the head 9, is introduced into the open end of the receptacle 5 to close it.

The electrode 8 is formed of an inner core 10 of stick carbon, as is usual in electrodes of this general type, at which the electrode extends upwardly through the opening 11 in the plug 9 and is preferably provided with a metal cap 12, the core 10 being surrounded by a mixture of ingredients, such as commonly provided for this purpose, and formed of graphite, manganese and chloride of zinc solution, and in addition sal ammoniac mixed with these ingredients in the proportion of about 10% to 15% of the total mix of the ingredients by weight, and the entire mixture being enveloped in a porous covering 8ª, as for example cheese cloth, shown as tied in place about the mixture by the cord 8ᵇ.

In accordance with my invention the electrolyte to be interposed between, and in contact with, the positive and negative electrodes, is of such character that upon mixing together the ingredients of which it is formed, it will very quickly, without the application of artifical heat thereto, become of the desired thickened, paste-like consistency. Any desirable mixture of materials forming the active elements of the electrolyte may be employed, provided however that the density of the solution be not less than 20° Baumé, such a solution of from 25° to 28° Baumé, being preferred.

To such solution is added a material which causes the electrolytic solution to become of paste-like consistency, substantially immediately, without the use of artificial heat. The material which I prefer to employ is powdered potato starch which when mixed with such an electrolytic solution, very quickly causes the solution to become of paste-like consistency.

While I do not wish to be understood as limiting my invention to use in connection with any particular mixture forming an electrolytic solution nor to potato starch as the material to render the electrolyte of paste-like consistency, the following materials and proportions have been found to effect very desirable results, the following serving merely as an example of the employment of my invention.

The example of electrolyte referred to involves the mixing of the following ingredients together in substantially the following proportions by weight:

|  | Per cent. |
|---|---|
| Calcium chloride | 27 |
| Sal ammoniac | 16 |
| Water | 51 |
| Potato starch | 6 |

The calcium chloride, sal ammoniac and water form an electrolytic solution of from 25° to 28° Baumé, and the potato starch serves to cause the solution to become of paste-like consistency to produce the semi-dry condition of the electrolyte, the solution, becoming of the consistency referred to by a very rapid action, under ordinary atmospheric conditions, practically rendering the battery of which it forms a part, ready for immediate use upon assembling the elements of the battery.

In the constructing of the particular form of battery shown, the electrolytic solution, with the potato starch or other similar functioning ingredient is introduced into the receptacle 5, and by preference the electrolytic solution first, and the potato starch thereafter, and both mixed thoroughly together, and the electrode 8, preferably preliminarily assembled with the head 9 as shown in Fig. 2, introduced into the receptacle 5 and the head into the open end of this receptacle to cause the electrode 8 to extend into the electrolytic solution in the receptacle and the head 9 to close the upper end of the receptacle and position the electrode as shown in Fig. 2, the electrolytic solution, very rapidly changing from liquid to paste-like form.

It will be understood that by constructing a battery in accordance with my invention none of the parts thereof, nor the electrolytic solution, nor the material used for changing this solution to paste-like consistency, are subject to deterioration in a state of separation, and thus these various parts and ingredients may be made up separately and retained in the dealer's hands for a long time without in any way impairing them for performing their functions to the maximum degree when assembled, as by the purchaser who, upon assembling the parts and the ingredients, as stated, may produce a perfectly fresh battery, the entire life of which may be utilized in the flash light or in connection with any other device with which it is used.

I prefer to employ potato starch, as the material for rendering the electrolytic solution of paste-like consistency and use an electrolytic solution of 20° Baumé or more, as thereby the desired consistency of the electrolyte may be effected, without presenting undue resistance to the passage of electric current through the electrolyte.

What I claim as new and desire to secure by Letters Patent is:

1. An electrolyte formed of an electrolytic solution of 20°, or more, Baumé, and potato starch, of a consistency permitting it to be poured upon initial mixture of its constituents while at atmospheric temperature.

2. The method of producing an electrolyte which consists in mixing at atmospheric temperature, with ingredients forming an electrolytic solution, potato starch for causing the solution to become of paste-like consistency.

3. The method of producing an electrolyte which consists in mixing potato starch, with the ingredients forming an electrolytic solution of a specific gravity of not less than 20° Baumé and not over 31° Baumé.

4. An electrolyte formed of an electrolytic solution of a specific gravity of not less than 20° Baumé and not over 31° Baumé, and potato starch.

5. The method of producing an electrotlye which consists in mixing at atmospheric temperature with ingredients forming an electrolytic solution, a material having the property of permitting the mixture to be poured upon initial mixing and causing the mixture thereafter to become of paste-like consistency under atmospheric temperature.

6. The method of producing an electrolyte which consists in mixing at atmospheric temperature, with ingredients forming an electrolytic solution, potato starch in such proportion as to permit the mixture to be poured upon initial mixing and causing the mixture thereafter to become of paste-like consistency under atmospheric temperature.

JOSEPH M. ASKIN.